(12) United States Patent
Blossfeld

(10) Patent No.: US 7,119,538 B2
(45) Date of Patent: Oct. 10, 2006

(54) OFFSET-REDUCED HALL SENSOR

(75) Inventor: Lothar Blossfeld, Breitnua (DE)

(73) Assignee: MICRONAS GmbH, Freiburg (DE)

( * ) Notice: Subject to any disclaimer, the term of this patent is extended or adjusted under 35 U.S.C. 154(b) by 69 days.

(21) Appl. No.: 10/810,323

(22) Filed: Mar. 26, 2004

(65) Prior Publication Data

US 2005/0001613 A1   Jan. 6, 2005

(30) Foreign Application Priority Data

Mar. 26, 2003 (DE) ................. 103 13 642

(51) Int. Cl.
  *G01R 33/07* (2006.01)
  *H01L 43/06* (2006.01)
(52) U.S. Cl. .................. 324/251; 324/207.2; 338/32 H
(58) Field of Classification Search ................ 324/251, 324/207.2; 338/32 H
  See application file for complete search history.

(56) References Cited

U.S. PATENT DOCUMENTS

| | | | |
|---|---|---|---|
| 4,577,250 A | 3/1986 | Sato et al. ................. 360/112 |
| 4,994,742 A * | 2/1991 | Lowther ...................... 324/251 |
| 5,406,202 A * | 4/1995 | Mehrgardt et al. ........... 324/251 |
| 6,064,202 A | 5/2000 | Steiner et al. ............... 324/251 |
| 6,154,027 A | 11/2000 | Alexander et al. ........... 324/251 |
| 6,674,322 B1 | 1/2004 | Motz ............................. 330/9 |
| 6,768,301 B1 * | 7/2004 | Hohe et al. .................. 324/251 |
| 2003/0155912 A1 | 8/2003 | Motz .......................... 324/225 |

FOREIGN PATENT DOCUMENTS

DE   43 02 342   7/1993

* cited by examiner

*Primary Examiner*—Reena Aurora
(74) *Attorney, Agent, or Firm*—O'Shea, Getz Kosakowski, P.C.

(57) ABSTRACT

A technique for determining an offset-reduced Hall voltage (Uh), and/or an offset voltage (UH, offset) of a Hall sensor (1) includes applying a Hall sensor current (I) at first and second taps (a1, a2, a3) of the Hall sensor (1), and determining a first Hall voltage (Uh1) at third and fourth taps (a3, a4) displaced from the first and second taps (a1, a2, a5). A second Hall sensor current is applied modified relative to the first, and a second Hall voltage (Uh2) is determined. The Hall voltage (Uh) and/or Hall voltage offset (Uh,offset) are determined from the first and second Hall voltages. To compensate any offset present, a second measurement applies the second Hall sensor current I at taps (a3, a4) that are spatially displaced relative to the first and/or second taps.

8 Claims, 4 Drawing Sheets

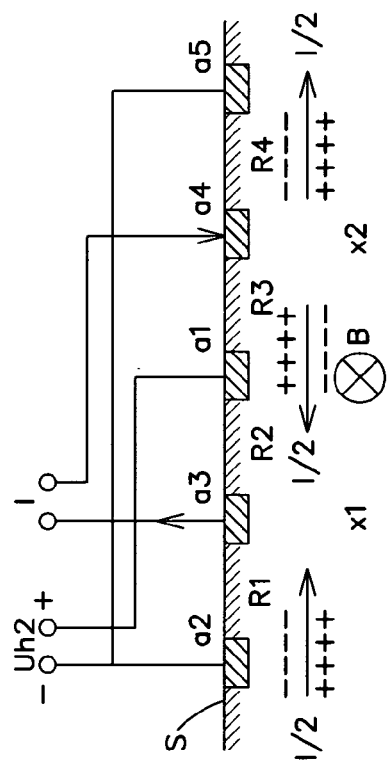
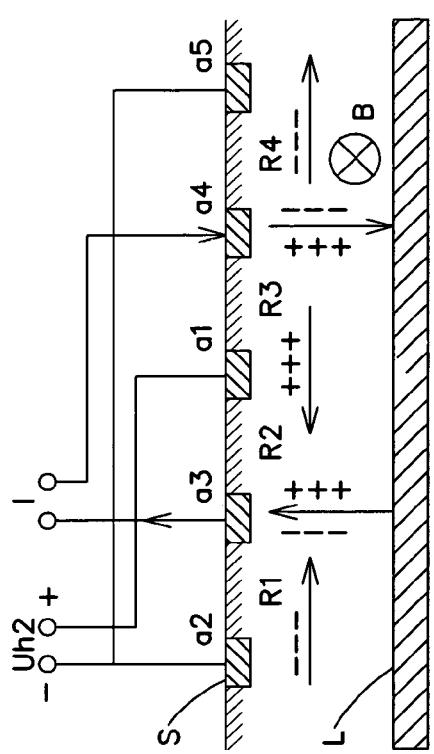
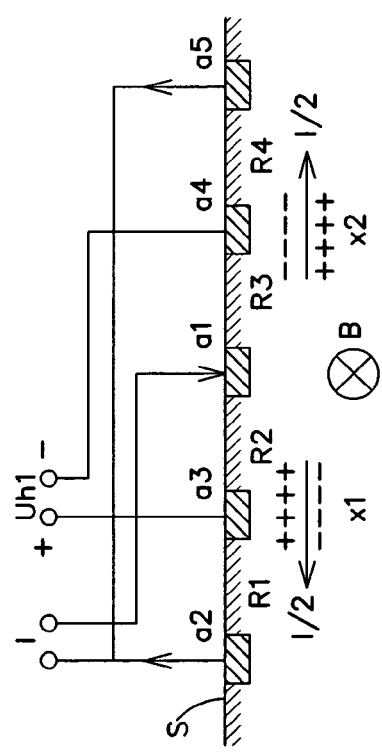
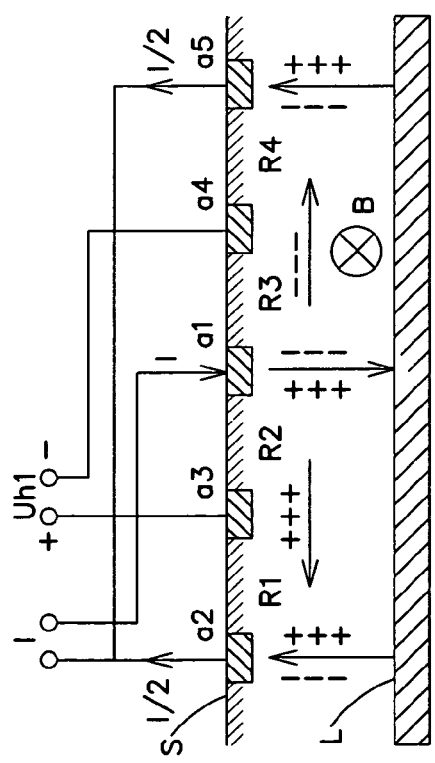

OFFSET-REDUCED HALL SENSOR

BACKGROUND OF THE INVENTION

The present invention relates to the field of magnetic field sensors, and in particular to an offset-compensated Hall sensor.

The publication "Auto & Elektronik" dated 4/2000, pages 19–23, discloses a Hall sensor that includes a complete integrated system, including the actual Hall sensor. The area of application is designed for the voltage range 100 µV–1 mV at magnetic field strengths of 2–20 mT. As a result, Hall sensors of this type are susceptible to offset drifts that may occur in response to changes in temperature and fluctuations in voltage, but which may also occur as a result of mechanical stress which the package, for example, transfers to the chip, or due to other factors. To reduce this offset, a so-called chopper method is provided, also known as the "zero-drift principle." In this method, the current direction of the Hall current through the Hall plate forming the actual sensor element is continually switched. Any corruptions in the measurement signal produced, for example, by geometrical distortions in the Hall plate, are incorporated into the measured value independently of the current direction, but are then either added or subtracted as a function of the current direction. Since both measurements are performed through identical structures having the same stress profile, the offset produced by mechanical stresses of the package is averaged out. With addition of the Hall voltages determined by the two Hall voltages with different directions of current flow, an alternating-voltage component indicates the offset while the direct current indicates the offset-compensated Hall voltage. In the case of subtraction, the reverse is true.

These vertical Hall sensors, in which taps are arranged on the surface of the Hall sensor element to feed in and feed out the Hall sensor current and to determine the Hall voltage, are principally employed to measure magnetic fluxes parallel to a planar crystal surface. As a result, two orthogonal field vectors can be measured with one chip. Methods of this type are employed in position sensors or rotary encoders. Due to offset voltages, however, the properties of currently known vertical sensors are often very inaccurate and are thus not considered for many possible applications.

Therefore, there is a need for a Hall sensor or method for determining an offset-reduced Hall voltage, which sensor or method provides a further reduction in offset voltages.

SUMMARY OF THE INVENTION

A technique for determining an offset-reduced Hall voltage and/or an offset voltage of a Hall sensor includes applying a Hall sensor current to a first and to second taps of the Hall sensor, and determining a first Hall voltage at third and fourth taps at a distance from the first and second taps, applying a second Hall sensor current modified relative to the first, determining a second Hall voltage, and determining the Hall voltage and/or Hall voltage offset from the first and second Hall voltages determined.

The remaining offset is removed by applying the second Hall current at taps that are spatially displaced from the first and/or second taps.

An offset-compensated Hall sensor includes taps to tap or apply voltages and/or currents, and a control device to apply a first Hall sensor current through a first central tap and two taps displaced relative to the first, and to tap a first Hall voltage at both sides of the first taps through a third and fourth tap that are located between the first tap and the second taps—the arrangement comprising a first measurement system. The offset compensation is implemented by the fact that the control device has, in a second measurement system, a switching device to apply a second Hall sensor current, or to apply the same Hall sensor current at taps that are spatially displaced from the first, second, and additional taps; and to tap a second Hall voltage at taps that are spatially displaced from the third and fourth taps.

Based on this spatially displaced tapping, current passes through portions of the actual Hall element or Hall sensor in different directions for the two different measurements. This approach provides for compensation of the offset during the combined processing of the two Hall currents obtained. Depending on computational expenditure here, either identical Hall currents or different Hall currents may be employed for the two measurements.

In an advantageous approach, not only the position of the current feed points is spatially displaced, but so too is the position of the taps to tap the Hall voltage. One embodiment, during the first measurement of the available five taps, of which the two outer ones are combined, are employed to feed in or feed out the Hall sensor current, or to tap the Hall voltage with offset. In the second measurement, the terminals for the current in-feed and out-feed, and for tapping the Hall voltage, are transposed. As a result, a simple switching of the terminals—which may be implemented by a mechanical or electronic switch—can generate a current flow situation analogous to that found in a known bridge circuit. An especially advantageous aspect here is that the repeated displacement in a second direction, or in the case of the bridge circuit, simply the additional reversal of the current and repeated implementation of the two measurements, may be exploited such that ultimately four individual Hall voltages with offset are determined which may be used to compensate the offset or offset voltage, and to output an offset-free voltage.

The addition of the first and second offset-affected Hall voltage, then division by two, allows the reduced, in particular, compensated Hall voltage to be determined. Conversely, subtraction of the two Hall voltages allows the Hall voltage offset to be determined.

To determine a magnetic field running at an angle of ≠90° relative to the angular component within the Hall sensor plane, a crosswise-configured arrangement of taps is provided on the surface of the Hall sensor. A central first tap may be employed here as the common central tap for the two tap arrangements configured orthogonally relative to each other in the surface plane of the Hall sensor element. It is of course possible to employ additional taps configured at other angles in the surfaceplane in order to determine, with the smallest possible computational expenditure, an angular component of the magnetic field within the plane of the sensor element.

In the event that a spatial arrangement of taps located in close proximity to the central tap is possible only in a limited number, it is also possible to use an interpolation by performing corresponding multiple measurements at different positions from the outer, central and inner taps.

These and other objects, features and advantages of the present invention will become more apparent in light of the following detailed description of preferred embodiments thereof, as illustrated in the accompanying drawings.

BRIEF DESCRIPTION OF THE DRAWING

FIGS. 2B–2E are four views illustrating the current flow through a bridge arrangement of this type at different switch positions;

FIGS. 3A and 3B are longitudinal sections through a Hall sensor with these taps, along with the voltage situations in the two different measurement systems;

FIGS. 5A and 5B show another embodiment having an additional layer on the bottom side of the actual Hall sensor.

DETAILED DESCRIPTION OF THE INVENTION

Figure 1:
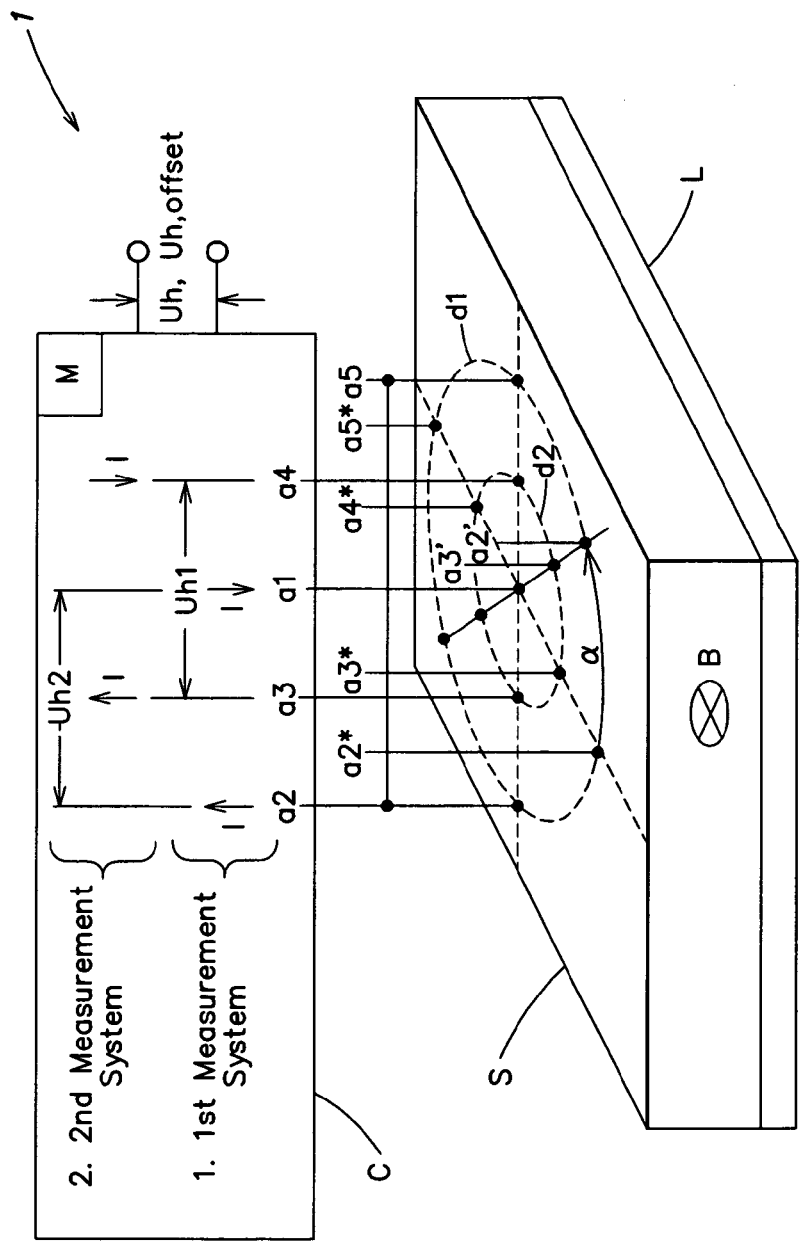
FIG. 1 is a perspective view of a Hall sensor element including a plurality of taps on the surface of the element as well as conductors that are routed from the taps to a circuit serving to interconnect the individual taps and to determine the offset-free Hall voltage.

FIG. 1 illustrates an embodiment of a vertical Hall sensor. This sensor is preferably an integral component of an integrated circuit which, in addition to an actual Hall sensor element S, also has an electronic analyzer in the form of a control circuit C. The actual Hall sensor element is composed of a planar sensor wafer through which flows a magnetic field B. A plurality of taps a1–a5, a2*–a5*, a2', a3' are located on one of the planar surfaces of Hall sensor element S. When a corresponding voltage is applied through these taps, an in-feed or out-feed of a Hall sensor current I occurs, as does the tapping of a Hall voltage Uh1, Uh2. In the embodiment shown, a base material or terminating material, such as a conducting layer L, is applied to the surface of Hall sensor element S opposite taps a1, a2, . . . .

In a first measurement system, the control circuit C serves to feed Hall sensor current I to the first central tap a1, and feed the current out through the two taps a2, a5 which serve as the second taps and are located on both sides relative to central tap A1. As a result, half of the fed-in Hall sensor current I is extracted from the Hall sensor element through each of the two second taps. Hall voltage Uh1 is tapped at the third and fourth tab a3, a4, these two taps being located on opposite sides of the first central tap a1 on the line leading to the respective outer second taps a2, a5. Individual taps a1–a5 may be disposed linearly and equidistantly on the surface of Hall sensor element S. Given an applied magnetic field B when Hall sensor current I is fed in, the field components perpendicular to the current flow or linear tap arrangement in the plane of Hall sensor element S are determined by inducing a corresponding Hall voltage and tapping it through the third and fourth taps a3, a4.

In addition, the control device C provides a second measurement system in which the same taps a1–a5 are used to apply Hall sensor current I and to tap a second Hall voltage Uh2. However, the individual taps a1–a5 are interconnected differently here than in the first measurement system. The current in-feed and out-feed are effected through the fourth or third taps a4, a3. Second Hall voltage Uh2 is tapped at the first and second taps a1, a2. As in the embodiment of the first measurement system, the two taps a2, a5 are expediently connected by a common terminal to control device C or shorted to each other.

In addition to the switching device to differentially interconnect the Hall sensor element S and its taps a1–a5 to determine the different first and second Hall voltages Uh1, Uh2, the control device C has a logic device that processes the two determined Hall voltages Uh1, Uh2 to determine an offset-compensated voltage Uh and/or an offset voltage Uh, offset in order to output these at the output of the Hall sensor 1.

Since the two measurement systems are actuated at different times t1 or t2, advantageously at a high switching frequency in an alternating sequence, the control device C also has a memory M in which at least one each of measured Hall voltages Uh1, Uh2 are temporarily stored. It is of course also possible to use memory M to store additional parameters, as well as any algorithms and the like required to perform the operational sequence.

In especially preferred embodiments, additional taps a2*–a5*, a2', a3', beyond the described first linearly arranged measurement group of taps a1–a5, are located on the surface of the Hall sensor element S to form additional measurement groups. Specifically, a second measurement group is provided that includes taps a1, a2*–a5* arranged orthogonally relative to the first measurement group. Using the two measurement groups arranged orthogonally relative to each other on the surface of the Hall sensor element S, along with the corresponding interconnection, the magnetic fields B may be determined in terms of spatial orientation within the plane of the Hall sensor element S.

In addition to or alternatively to the second measurement group arranged orthogonally relative to the first measurement group, additional taps a2', a3' may be arranged on the surface of the Hall sensor element S at an angle of $\alpha \neq 90°$. The individual taps are advantageously arranged on concentric tracks d1, d2 around the first central tap a1.

Figure 2A:
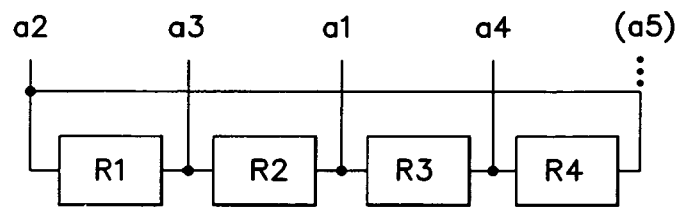
FIGS. 2A and 2B are schematic views of an equivalent circuit diagram for a linear configuration of taps in a design analogous to the tap arrangement on the Hall sensor surface, and in a bridge circuit design.
Figure 2B:
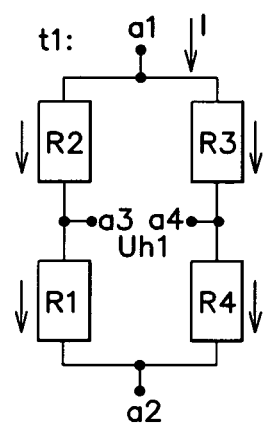

The wiring and current path of the Hall sensor element S in the two measurement systems are illustrated diagrammatically in FIG. 2A–2D. As shown in the equivalent circuit of FIG. 2A, taps a1, a3, a4, and a2 are located on the surface of the Hall sensor element S in order to introduce or extract Hall sensor current I, or to tap the Hall voltage. The material of the Hall sensor element between the individual taps a1–a4 forms an electrical resistance for the conducted Hall sensor current I, this resistance being illustrated in the equivalent circuit by resistor elements R1, R2, R3, R4. By combining the two external taps a2, a5, a bridge circuit is created, as illustrated in FIG. 2B.

Figure 2C:
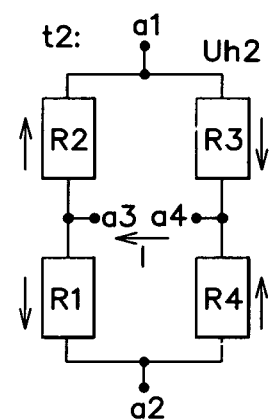
Figure 2D:
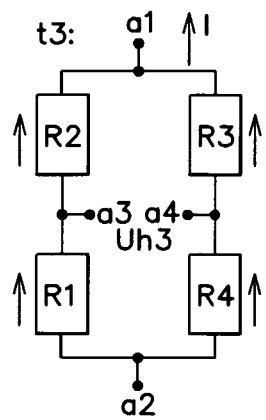
Figure 2E:
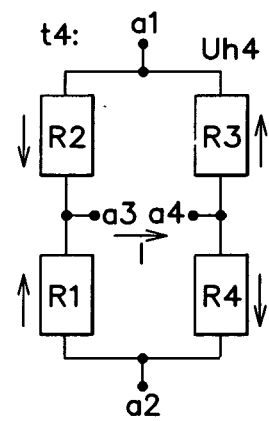

In the bridge circuit, with the aid of the control circuit C of the first measurement system, the Hall sensor current I is fed in or fed out at the first or second taps a1, a2 at the first time t1, and first Hall voltage Uh1 is tapped at third and fourth taps a3, a4. Depending on the direction of current flow, a current flow is produced in the bridge circuit corresponding to the current flow situation shown in FIGS. 2B or 2D. In the case of the wiring of the second measurement system, the control device C feeds in or feeds out Hall sensor current I through the third or fourth taps a3, a4 at the second time t2, then taps second Hall voltage Uh2 through first or second taps a1, a2. Depending on the direction of current flow, the current flows shown in FIGS. 2C, 2E are produced within the bridge system, or analogously within Hall sensor element S.

The different Hall voltages Uh1 and Uh2 thus determined from the two measurements at first and second times t1, t2 are added up in the control device C, thereby producing a doubled offset-compensated Hall voltage, the value of which may be divided by two. By subtracting the two offset-affected Hall voltages Uh1, Uh2 from each other, the offset voltage is determined.

In principle, one interconnection at a first time t1 with the first measurement system, and at a second time t2 with the second measurement system, is sufficient to determine an offset-compensated Hall voltage. As is evident from the current flows illustrated in FIGS. 2B–2C, however, the Hall sensor current passes through certain resistance regions only in one current direction each. For this reason, it is advantageous to repeat the measurement in the first and second measurement systems at times t3, t4 to determine additional offset-affected Hall voltages Uh3, Uh4 with the current flow direction reversed. Finally, four offset-affected voltage values Uh1–Uh4 are then added up and divided by four to determine an offset-free Hall voltage Uh.

FIG. 2B shows the current flow of Hall sensor current I from the first tap a1 to the second tap or taps a2. In the diagram, current flows through all the resistor elements R1–R4 in the same direction from top to bottom. When the second measurement system is used at time t2 (FIG. 2C), the Hall sensor current flows starting from the third tap a3 to the fourth tap a4, where the current again flows from top to bottom through the resistor elements R1 and R3, that is, in the same direction as at the first time t1, whereas current flows through the remaining resistor elements R2, R4 in the opposite direction. As shown in FIG. 2D, at the third time t3 the first measurement system is being used with the current direction of Hall sensor current I reversed. As a result, current is flowing through all the resistor elements R1–R4 in the reversed direction for the Hall sensor current as compared to the first time t1. FIG. 2E illustrates a measurement at the fourth time t4 with the second measurement system, the current flow here thus moving in the opposite direction. As compared with the measurement at the second time t2 with the second measurement system, current now flows through the individual resistor elements in the reverse direction. Based on the determination of four accordingly offset-affected Hall voltages Uh1–Uh4, measurement results are incorporated into the addition which take into account a current flow of Hall sensor current I/2 through each of the resistor elements R1–R4, specifically, twice each in each of the two directions.

As is evident from the above description, a fundamental principle here entails forming a vertical bridge structure (FIG. 2A), the offset errors of which are eliminated by a chopper technique. Unlike the chopper technique known from the prior art in which a Hall sensor current I is introduced through one tap a1, then extracted through another tap a2 in order to reverse the current direction in a subsequent step, in the present embodiments the introduction and extraction of Hall sensor current I is implemented by a spatial displacement relative to the other taps a3, a4. Essentially, at least one of the two taps for introducing or extracting Hall sensor current I is set to a position that was not utilized for the current flow of Hall sensor current I in the previously used measurement system. Preferably, the in-feed and out-feed of Hall sensor current I is, however, implemented through taps a3, a4 used at the first time t1 to tap Hall voltage Uh1, while Hall voltage Uh2 is measured at the second time t2 through taps a1, a2 which were used at first measurement time t1 to feed in and feed out Hall sensor current I. In the embodiment having four different measurement conditions, two measurements are performed with the first measurement system and two measurements are performed with the second measurement system, with respectively positive and negative current flow directions for Hall sensor current I.

FIGS. 3A and 3B show the current flow conditions and polarization conditions in a cross-sectional view through the Hall sensor element S for the first and second measurement systems. The Hall sensor element S is preferably a semiconductor crystal, such as n-doped silicon, into which Hall sensor current I is fed through the first tap a1. In the diagram to the left or right of the feed-in point, half of the introduced Hall sensor current I is again captured and again shunted through a second plus an additional second or fifth tap a2, a5, displaced by a distance x1 or x2 from the first tap a1. The fraction of magnetic field B running perpendicular to the current flow through the chip plane or plane of Hall sensor element S interacts with Hall sensor current I/2 to induce Hall voltage Uh1 that is applied both horizontally relative to magnetic field B as well as vertically relative to current flow I/2. In the case of the preferred vertical sensors a1–a5, the Hall field runs vertically relative to the surface of the Hall sensor element S. As a result, a positive Hall potential is created in the surface region between the first tap a1 and the second tap a2, shown on the left side of the diagram, while a negative Hall potential is produced, in accordance with the varying current flow directions, on the right side of the diagram between first tap a1 and the additional second or fifth tap a5. When both measurement points for the Hall voltage Uh1, that is, third and fourth taps a3, a4, are at exactly the same potential—specifically, whenever magnetic field B or current flow I equals zero—then the Hall voltage between measurement points a3, a4 is also zero. As soon as a magnetic field B appears perpendicular to current direction I/2 in the plane of Hall sensor element S, the measurable Hall voltage Uh1 is not equal to zero. This voltage is the Hall voltage Uh1 generated by magnetic field B interacting with current flow I/2.

The material regions of the Hall sensor element S between the individual taps a2–a3, a3–a1, a1–a4, a4–a5/a2 are resistance regions to be traversed by the Hall sensor current I, these regions corresponding to the resistor elements R1–R4 shown in the equivalent circuit diagrams of FIG. 2. This bridge composed of resistor elements or resistance regions R1–R4 exhibits a significant offset error since resistance values R1–R4 are usually not of equal size. The reason for these disparities includes adjustment errors, different contact resistances, mechanical stress caused by the installation of Hall sensor element S in a frame or the like, or by geometry defects.

These embodiments make use of the fact that a bridge has the property that the amount of the offset error is the same for constant linear resistances, specifically, independently of whether Hall sensor current I flows between first and second taps a1, a2, or between third and fourth taps a3, a4. Assuming that a positive voltage is applied at first tap a2 and a current is fed in, where resistance value R2 between the first and third taps a1, a3 is to be smaller than resistance value R3 between the first and fourth taps a1, a4, then a positive offset and positive Hall voltage U (a3, a4)=Uh1=Uha11+Uh, offset is produced at the measurement points for Hall voltage Uh1, that is, through third and fourth taps a3, a4.

If Hall sensor current I now flows from fourth tap a4 to third tap a3, as shown in FIG. 3B, then a negative offset voltage is produced at the first and combined second taps a 1, a2, a5—however with a positive Hall voltage, that is, U(a1, a2)=Uh2=Uha11−Uh,offset.

If both measurements are carried out in chronological sequence t1, t2 and the measured Hall voltages Uh1, Uh2 are then added up, this operation produces the doubled actual and offset-free Hall voltage 2*Uha11=Uh1+Uh2. As a result, the bridge offset is eliminated. By subtracting the measured and offset-affected Hall voltages Uh1, Uh2, the doubled offset voltage 2*Uh, offset=Uh1−Uh2 is determined. In this procedure, the polarity of the Hall voltage is not altered by switching the bridge between the first and second measurement systems, but the offset is changed. Hall voltages Uh1, Uh2 from the two measurements may also be different, as long as only the offset is to be compensated.

The conditions for compensating the offset are easily derived. Assuming that a voltage Ua12 is applied at the first and second taps a1, a2, then a current Ia12=Ua12/(R2+R1) flows, as does a current Ia15=Ua12/(R3+R4). Assuming that all resistances R1–R4 are equal, then Ia1=Ia12+Ia15 and Ia12=Ia15, with the result that no offset is present for bridge voltage Uh1 between the third and fourth taps a3, a4, and this voltage then equals the actual Hall voltage Uh. Hall voltage Uh here is positive at the third tap a3 relative to the fourth tap a4. In the event the resistance values are not equal, for example, the first resistance segment has a smaller resistance value than the second resistance segment, then the potential at the third tap a3 is lower than at the fourth tap a4. A bridge offset is produced through the third and fourth taps a3, a4 of Uoffset1=Ia12/(R1−R2). The result is an offset-affected voltage Uh1=Uh+Uoffset1.

When a voltage Ua34 is applied at the third and fourth taps a3, a4 to cause the current I=I45=I42 to flow between them, the current is determined for I42=U34/(R4+R1)=U34/(R3+R2) where I4=I45+I43 and I3=I23+I43. The two numbers after the letter I indicate the number of taps between which the current flow must be registered. The same applies to the numbers after the upper-case U. Given a constant magnetic field B, a positive Hall voltage U12=Uh2 is produced at the third and fourth taps a3, a4. If the resistance value of first resistance segment R1 is smaller than the value of second resistance segment R2, as is the case here, then the potential at second tap a2 is lower than at first tap a1. Between these taps, a bridge offset of Uoffset2=Ia43/(R2−R1), and thus a voltage of Uh2=Uoffset2+Uh, is created.

If the two determined and offset-affected voltage values Uh1, Uh2 are added, the result, when the two currents Ia43 and Ia12 are of equal magnitude, is a Hall voltage Uh=Ua15+Ua34=2*Uh+Uoffset1−Uoffset2=2*Uh. The current feed and voltage feed into the bridge must be implemented as precisely as possible to achieve this.

Calculation of the resistance bridge shows that the offset is equal as long as the resistance and current conditions do not change in both measurements. Compensation may be affected if the measuring impedance at the bridge is not taken into account. The rule that applies here is that the measuring impedance must be high for current in-feed and low for voltage in-feed.

Figure 4A:
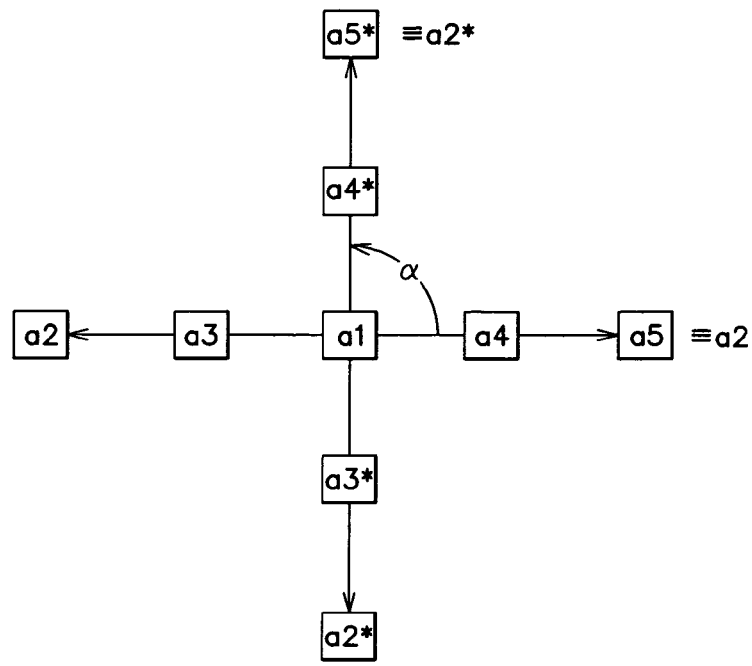
FIGS. 4A and 4B in top view show different arrangements for taps to determine a magnetic field that runs obliquely or rotates within the Hall sensor plane.
Figure 4B:
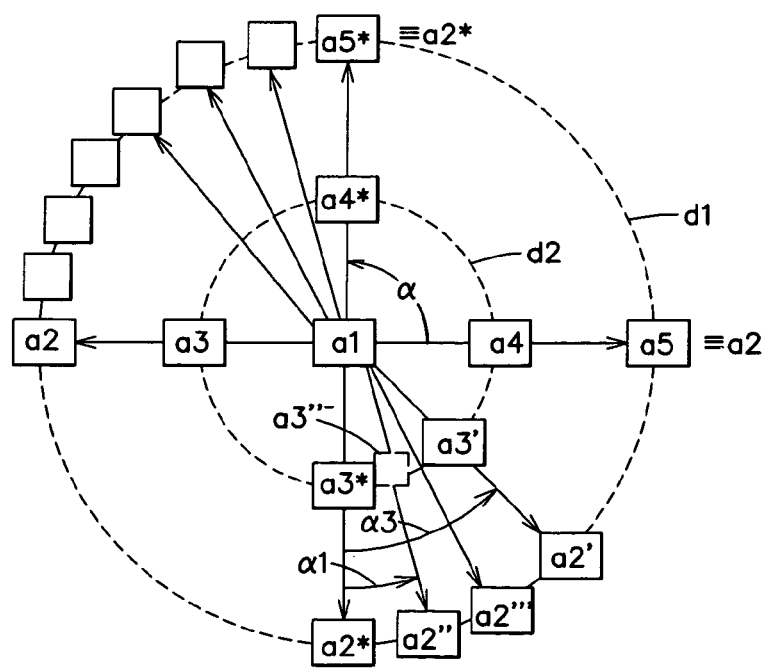

FIG. 4a shows a crosswise arrangement of taps on the surface of the Hall sensor element S. Based on this arrangement, two central measurement groups are formed linearly around a central tap a1 from a first linear tap arrangement a1–a5, and from a second measurement group with linearly arranged taps a2*–a5* oriented orthogonally relative to this arrangement at an angle of α=90°. With this arrangement, magnetic field vectors B in the plane of the Hall sensor element can be determined that do not run orthogonally relative to one of the two measurement groups. In particular, an arrangement of this type is capable of making measurements of rotational angles. Using a vertical Hall-tap structure of this type, it is possible to measure magnetic field vectors of magnetic field B in the plane of Hall sensor element S or of the chip plane, whereby a polar array uses a scanning process to determine the maximum Hall voltage. In particular, contacts perpendicular to the current flow at the chip surface may be also used to take measurements of a magnetic flux perpendicular to the surface of Hall sensor element S, thereby enabling three main vectors of a magnetic flux to be determined using a single component.

With the goal of reducing computational expenditure in the control device C of the sensor 1, or of an external control device to which Hall voltages Uh1, Uh2, Uh are fed, it is possible to arrange a plurality of additional taps a3', a2', a2", a2'" on the surface of Hall sensor element S. These additional taps are advantageously arranged on concentric tracks d1, d2 around the central first tap a1. As the diagram shows, it is also possible to arrange a greater number of second taps a2*, a2', a2", a2'" on track d1 at a greater distance from the central first tap a1 than on track d2 which is located closer to the central first tap a1. An arrangement of this type is advantageous, for example, if the placing of an equally large number of contact points on the interior second track d2 is not feasible for reasons of space, or for reasons related to metrology, or in view of possible interference due to the size of the required contact points. In this case, to effect a determination of a missing tap a3'"⁻ at an alignment angle of α1, an interpolation of the values from multiple measurements may be performed by individual taps a2*, a2", a2'", a2' on external track d1 and existing taps a3*, a3' on interior track d2.

In particular, with multiple measurement groups arranged on the surface, it is possible to effect Hall voltages to determine a magnetic field B, including its angular course through Hall sensor element S, using different individual measurements for each individual measurement group, as well as with a common measurement for multiple measurement groups simultaneously. In this last case, for example, a Hall sensor current is fed in through the central tap a1, and extracted through multiple or all external second taps a2, a2*, a5, a5*. In analogous fashion, Hall voltages are also tapped simultaneously in multiple directions.

Required calculations may be implemented both by logic elements, as part of an integrated circuit arrangement within the control device C, as well as by an arithmetic unit within the control device C, or in an external arithmetic unit.

One aspect that must be highlighted is the use of a vertical Hall sensor I in which the vertically generated Hall voltage is measured, which voltage is induced by a current flow of Hall sensor current I in a semiconductor crystal S and in a magnetic flux B within the plane of the crystal surface, wherein two independent measurements are performed by the displacement, specifically the transposition, of the measurement points for the current feed points and voltage tapping points. The offset voltage or Hall voltage is thus eliminated through the addition or subtraction of the two measurement results.

A system of this type may be described by a bridge of rotationally symmetric design, (i.e., the bridge is composed of resistance regions of equal size). In a system of this type, the vertical Hall voltage is measured at zero current. Using a crosswise configured structure, it is also possible to determine two orthogonal magnetic field that which enable the rotational angle of the magnetic field to be determined. In a preferred embodiment, the current directions of the system are rotated incrementally about small angles α1, α2, α3 to determine the direction of magnetic field vector B in the plane of the Hall sensor element S using simple intensity comparisons. In addition, the Hall sensor potential can be tapped at measurement points applied perpendicularly to a current flow on the surface in order also to measure a magnetic flux.

The time intervals for the individual measurements must be chosen such that there is no expectation of any excessively large variation of magnetic field B.

FIGS. 5A and 5B essentially show elements from FIGS. 3A and 3B, and so for the sake of simplification only differences will be described. The Hall sensor element S shown rests on a base L that is preferably composed of a low-resistance material. A current flow with two components, a vertical component and a lateral component, passes through resistance regions R1–R4. In the two chopper phases, current accordingly no longer flows through the same resistance regions in the bridge circuit. As a result, in a configuration of this type inferior offset compensations may be obtained; however, a minimum level of offset compensation is nonetheless achieved. The degradation becomes worse as base layer L becomes more conductive, and for this reason a rear-side short circuit is prevented in the preferred embodiments by applying a highly conductive material. If a base layer of this type is required, a high-resistance material is thus preferred, such as one composed, for example, of an oxide or a PN-junction operating in the reverse direction.

Although the present invention has been shown and described with respect to several preferred embodiments thereof, various changes, omissions and additions to the form and detail thereof, may be made therein, without departing from the spirit and scope of the invention.

What is claimed is:

1. A method for determining an offset-reduced Hall voltage of a Hall sensor, comprising:

applying a first Hall sensor current (I) at first and second taps of the Hall sensor, and determining a first Hall voltage at third and fourth taps of the Hall sensor spatially displaced from the first and second taps, applying a second Hall sensor current modified relative to the first Hall sensor current, and determining a second Hall voltage, and determining the offset-reduced Hall voltage from the first and second Hall voltages, where the application of the second Hall current is effected at the third and fourth taps, and the offset-reduced Hall voltage is determined with a first linear arrangement of the first, second, third and fourth taps to determine an angular component of a magnetic field, and an additional Hall voltage is determined with a second linear arrangement of taps in an arrangement which is oriented at an angle relative to the first arrangement.

2. An offset-reduced Hall sensor, comprising:

a first tap, a second tap, a third tap, a fourth tap and a fifth tap each configured and arranged to tap or apply voltages and/or currents, where the second and fifth taps are shunted together, and a control device to apply a first Hall sensor current through the first tap and the second taps that is spatially displaced relative to the first tap, and sense a first Hall voltage between the third and fourth taps, where the first tap is central with respect to the remaining taps and the third tap is located between the first and second taps, and the fourth tap is located between the first and fifth taps, where the control device has a switching device to apply a second Hall sensor current through the third and fourth taps and sense a second Hall voltage between the first and second taps.

3. The hall sensor of claim 2, comprising a memory device that stores the first and second Hall voltages, and where the control device processes the first and second Hall voltages to provide an offset-compensated Hall voltage.

4. The hall sensor of claim 3, wherein the first, second, third, fourth and fifth taps are located in a plane spanned by a flow direction of the first Hall sensor current and of a magnetic field to be detected.

5. The hall sensor of claim 3, wherein the first, second, third, fourth and fifth taps are configured and arranged in a vertical Hall sensor arrangement.

6. The hall sensor of claim 2, comprising:

a sixth tap, a seventh tap, an eighth tap and ninth tap where the sixth and ninth taps are shunted together, where the first tap is located between the seventh and eight taps, and the seventh tap is located between the first and sixth taps while the eight tap is located between the first and ninth taps, where a line formed by the first, sixth, seventh, eight and ninth taps is offset by an angle from a line formed by the first, second, third, fourth and fifth taps.

7. The hall sensor of claim 6, wherein the second, fifth, sixth and ninth taps are each located a first distance from the first tap; and the third, fourth, seventh and eighth taps are each located a second distance from the first tap, where the second distance is greater than the first distance.

8. The hall sensor of claim 7, wherein the control device determines voltage values associated with intermediate tap positions that do not include an actual physical tap.

* * * * *

UNITED STATES PATENT AND TRADEMARK OFFICE
CERTIFICATE OF CORRECTION

PATENT NO. : 7,119,538 B2
APPLICATION NO. : 10/810323
DATED : October 10, 2006
INVENTOR(S) : Lothar Blossfeld It is certified that error appears in the above-identified patent and that said Letters Patent is hereby corrected as shown below:

Title page, item [74]

Attorney, Agent, or Firm
Delete "O'Shea, Getz Kosakowski, P.C." and insert --O'Shea, Getz & Kosakowski, P.C.--

Column 3
Line 30, before "Hall" insert --the--
Line 36, before "Hall" insert --the--
Line 36, before "taps" insert --the--
Line 41, before "central" insert --the--
Line 48, before "Hall" insert --the--
Line 49, before "Hall" insert --the--
Line 51, before "Hall" insert --the--
Line 56, before "Hall sensor" insert --the--
Line 63, before "connected" delete "expediently"
Line 64, before "control" insert --the--

Column 4
Line 9, before "measured" insert --the--
Line 11, before "memory" insert --the--
Line 34, delete "FIG." and insert --FIGS.--
Line 35, before "taps" insert --the--
Line 54, before "first" insert --the--

Column 5
Line 12, before "Hall" insert --the--
Line 24, before "Hall" insert --the--
Line 50, before "Hall" insert --the--
Line 51, before "Hall" insert --the--
Line 53, before "Hall" insert --the--
Line 54, before "taps" insert --the--
Line 55, after "tap" insert --the--
Line 55, after "while" insert --the--
Line 56, before "taps" insert --the--
Line 57, before "first" insert --the--
Line 57, before "Hall" insert --the--
Line 62, before "Hall" insert --the--

UNITED STATES PATENT AND TRADEMARK OFFICE
CERTIFICATE OF CORRECTION

PATENT NO. : 7,119,538 B2
APPLICATION NO. : 10/810323
DATED : October 10, 2006
INVENTOR(S) : Lothar Blossfeld It is certified that error appears in the above-identified patent and that said Letters Patent is hereby corrected as shown below:

Column 6
Line 1, before "Hall" insert --the--
Line 7, before "magnetic" insert --the--
Line 10, before "Hall "insert --the--
Line 11, before "magnetic" insert --the--
Line 11, before "current" insert --the--
Line 19, before "first" insert --the--
Line 20, after "tap" insert --a2,--
Line 20, after "a5" insert --, respectively--
Line 21, before "third" insert --the--
Line 22, before "magnetic" insert --the--
Line 23, before "current" insert --the--
Line 24, before "measurement" insert --the--
Line 25, before "current" insert --the--
Line 26, before "Hall" insert --the--
Line 28, before "magnetic" insert --the--
Line 29, before "current" insert --the--
Line 36, before "resistance" insert --the--
Line 45, before "Hall" insert --the--
Line 45, before "first" insert --the--
Line 46, before "third" insert --the--
Line 47, delete "a2" and insert --al--
Line 52, before "Hall" insert --the--
Line 53, before "third" insert --the--
Line 54, before "Hall" insert --the--
Line 54, before "fourth" insert --the--
Line 55, before "third" insert --the--
Line 56, after "taps" delete "a"
Line 57, delete "1" and insert --al--

Column 7
Line 11, after "Uh." insert --The--
Line 29, before "first" insert --the--
Line 30, before "second" insert --the--
Line 31, before "second" insert --the--
Line 31, before "first" insert --the--
Line 47, delete "4$a$" and insert --4A--
Line 50, before "central" delete "a" and insert --the--
Line 60, before "magnetic" insert --the--
Line 60, before "Hall" insert --the--
Line 65, before "Hall" insert --the--

UNITED STATES PATENT AND TRADEMARK OFFICE
CERTIFICATE OF CORRECTION

PATENT NO. : 7,119,538 B2
APPLICATION NO. : 10/810323
DATED : October 10, 2006
INVENTOR(S) : Lothar Blossfeld It is certified that error appears in the above-identified patent and that said Letters Patent is hereby corrected as shown below:

Column 8
Line 5, before "Hall" insert --the--
Line 19, before "individual" insert --the--
Line 20, before "external" insert --the--
Line 20, before "existing" insert --the--
Line 20, before "interior" insert --the--
Line 25, before "Hall" insert --the--
Line 38, after "sensor" delete "I" and insert --1--
Line 40, before "Hall" insert --the--
Line 57, before "magnetic" insert --the--
Line 65, before "magnetic" insert --the--

Column 9
Line 11, before "base" insert --the--

Column 10
In the claims, claim 2, line 2, after "second" delete "taps" and insert --tap--

Signed and Sealed this

Nineteenth Day of December, 2006

JON W. DUDAS
*Director of the United States Patent and Trademark Office*